Figure 1:
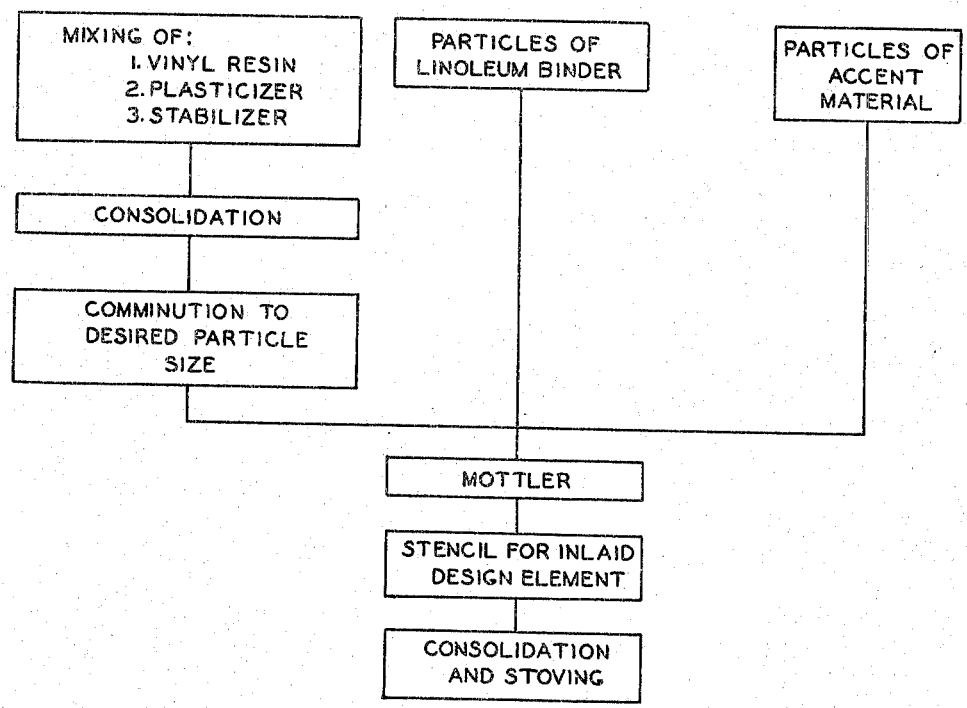

June 13, 1967 T. G. HARRIS 3,325,337
DECORATIVE SURFACE COVERING COMPOSITIONS COMPRISING
VINYL RESIN AND LINOLEUM BINDER
Filed Dec. 1, 1961

INVENTOR.
THOMAS G. HARRIS
BY *William G. Taylor*

United States Patent Office 3,325,337
Patented June 13, 1967

3,325,337
DECORATIVE SURFACE COVERING COMPOSITIONS COMPRISING VINYL RESIN AND LINOLEUM BINDER
Thomas G. Harris, East Hempfield Township, Lancaster County, Pa., assignor to Armstrong Cork Company, Lancaster, Pa., a corporation of Pennsylvania
Filed Dec. 1, 1961, Ser. No. 156,347
6 Claims. (Cl. 161—5)

This invention relates to resilient linoleum surface coverings having inlaid design elements in which particles of accent materials are visible interiorly of the design elements, the design elements creating what may be said to be a window-like element in which the accent particles are visible such as to provide novel highlighted design effects, a method for making such surface coverings, and a novel composition of matter useful in achieving the desired effects.

The resilient floor covering industry in recent years has been faced with the problem of satisfying more discriminating consumers in their demands for greater diversification in designs and design effects in surface coverings for installation in homes, commercial establishments, churches and schools throughout the nation. A tremendous expansion has taken place since the war in the varieties of materials utilized in producing such floor products, as well as wall and countertop materials, and it has been found that many of the newer synthetic resins are well suited for use in the fabrication of surface coverings and they have greatly diversified design possibilities. Resilient composition surface covering materials prepared from linoleum compositions by well-known processes, however, continue to find substantial support in consumer buying. This is true even though many of the design effects achievable with the newer synthetics such as the vinyls are not capable of duplication with the opaque compositions used in forming the resilient linoleum composition surface covering materials.

Efforts have continued to be made to achieve unique design effects in surface coverings of the linoleum type, thus accent materials such as glitter particles have been added along the linoleum composition to highlight the surface coverings produced therefrom. Because the compositions utilized in forming linoleum surface coverings are of an opaque nature, such use of accent materials for creating new effects has been somewhat limited insofar as they are of necessity randomly distributed throughout the composition and only have a noticeable decorative effect where they appear on the surface of the materials prepared therefrom. Where glitter particles have been used they usually appear as distinct spots of glitter fairly evenly distributed over the surface of the product, those glitter particles remaining below the surface adding nothing of a decorative nature to the product except insofar as they might possibly be exposed due to the wearing away of the surface layer. In the vinyl products the metallic glitter particles have been combined with substantially transparent or translucent vinyl resins which has resulted in the glitter particles acting as a highlight at the surface and interiorly of the product to create novel three dimensional effects which in turn have proven very attractive to the consumer. In spite of the popularity of such flooring materials, such effects have not heretofore been achieved in linoleum products.

The primary object of this invention is to provide molded linoleum surface coverings having inlaid, novel design effects which are achieved through the use of a novel composition of matter such that, on processing into a finished surface covering, the design element acts as a substantially transparent or translucent window in which various types of accent materials may be highlighted.

Still other objects of this invention will become more apparent from the description which follows:

I have discovered that novel design effects can be achieved in molded inlaid linoleum products by forming inlaid designs using a mottle of special composition. Basically the mottle composition is comprised of particles of a clear or substantially transparent vinyl resin mix which is compatible with linoleum and particles of a regular linoleum binder. By clear or substantially transparent vinyl resin mix it is meant to include tinted clear resins, i.e., translucent materials, and though the vinyl resins encompassed by this invention may appear to be opaque as a powder they fuse to a transparent or translucent mass. The resilient linoleum surface coverings of this invention are manufactured in accordance with the usual inlaid techniques using a stencil-type lay-up for forming the desired design effects, the specially highlighted inlaid elements being formed from the novel mottle composition having incorporated therein particles of accent material. A flow diagram illustrating the method of forming a surface covering in accordance with the method of this invention is set forth in FIG. 1 of the attached drawings.

In forming the molded, inlaid linoleum product in accordance with the method of this invention, the majority of stencils employed feed regular molded linoleum mix onto an appropriate backing material such as asphalt saturated felt, water-laid asbestos-rubber felt, or any of the other well-known backing materials. Specific stencils feed the specially prepared mottle onto the backing material to form the special design elements in which the particles of accent material which are mixed with the special mottle composition, upon consolidation and aging, are visible throughout the design element and create a three dimensional highlighted effect. After the stencil lay-up of the desired pattern, the backing material carrying the linoleum forming composition is pressed, employing a cycle similar to that used for regular linoleum, using a release agent if desired between the press platen and the linoleum composition to insure against sticking of the linoleum composition thereto. After the pressing cycle, the goods are stoved in the usual manner to age the linoleum. Any embossing may also be accomplished after pressing and prior to stoving.

The particles of clear thermoplastic vinyl resin used in the special mottle composition of this invention are particles of a plasticized resin compatible with the particles of linoleum binder. I have found that a hydrolyzed vinyl chloride-vinyl acetate copolymer resin containing about 10% vinyl acetate of which from 20 to 50% of the acetate groups are hydrolyzed and polyvinyl acetal resins, such as polyvinyl butyral, are particularly suitable, being highly compatible with the linoleum mix and forming an integral smooth sheet stock therewith.

The particles of linoleum binder are formed of filled particles of oxidized and polymerized siccative oil-resin gels such as an oxidized and polymerized linseed oil-rosin gel containing whiting and wood flour as a filler. Such siccative oil-resin gel binders are well-known to those skilled in the linoleum art.

Particles of any accent material which will create highlight effects may be used in the mottle. Most particularly the invention is concerned with the use of particles of metallic glitter such as fine metallic chips of aluminum although particles of other accent materials such as artificial pearl chips, phosphorescent pigments and colored glass chips might be used equally as well.

To reduce segregation of the particles in the mottle, the particles of linoleum binder and the particles of vinyl resin are maintained substantially the same in size. The chips or fine particles of accent are somewhat smaller in size so as to create a more intensified highlight effect and, being thin and light by nature, they tend to remain well distributed throughout the mottle and do not present a problem of segregation.

The particles of linoleum binder and vinyl resin may vary to a considerable degree in particle size, the only criterion being that the average size of the particle must be less than the thickness of the design element which is formed from the mottle and preferably the average size of the particles is less than ¾ of the thickness of the surfacing layer prior to consolidation. The size of the accent particles may approach the size of the particles of linoleum binder and vinyl resin but must not be any larger in size and preferably are smaller to give a more concentrated highlight effect.

In forming the particles of clear vinyl resin mix used in preparing the mottle of special composition in accordance with this invention, by way of example, from 50 to 75% by weight of a hydrolyzed vinyl chloride-vinyl acetate copolymer resin containing about 10% vinyl acetate of which 20 to 50% of the acetate groups have been hydrolyzed is charged into a conventional mixer and from 15 to 35% by weight of a liquid plasticizer for the vinyl resin along with 3 to 10% by weight of a conventional stabilizer for the vinyl resin are added gradually to insure optimum distribution. The mixer is discharged, after the ingredients are thoroughly mixed, onto a two-roll compacter. The material from the compacter, in the form of a weak sheet, is then passed through a comminutor such as a grinder where it is reduced to the desired particle size.

The particles of vinyl resin thus prepared are then mixed with particles of a linoleum binder composition comprised of a filled, oxidized and polymerized drying oil-resin gel of the conventional type along with 2 to 15% by weight of particles of accent material. The particles of clear vinyl mix are present in the mottle to the extent of from 40 to 75% by weight of the mottle and the filled linoleum particles are present to the extent of from 23 to 45% by weight of the mottle, the particle sizes of the linoleum and vinyl being preferably maintained approximately the same in size so as to retard segregation of the particles of any one of the ingredients.

The clear mix in the mottle provides a background for the accent particles and serves not only to bind the accent tightly into the over-all system but also imparts an appearance of depth so that the accent particles interiorly of the design as well as those at the surface thereof all act to achieve the desired concentrated highlighted design effect.

Figure 2:
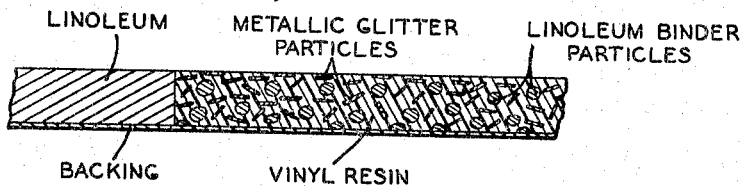

The following examples, when considered in conjunction with FIG. 2 of the drawings, will more clearly illustrate this invention:

*Example 1*

68.25% by weight of a hydrolyzed vinyl acetate-vinyl chloride copolymer containing about 10% vinyl acetate of which 20 to 50% of the acetate groups have been hydrolyzed is charged into a B & Z mixer and 16.25% by weight of dioctyl phthalate, 7.95% by weight of epoxidized soya oil, 1.25% by weight of phenyl phosphate and 6.30% by weight of a barium-cadmium caprate stabilizer are added gradually to insure optimum distribution. The material is blended in the mixer and discharged when uniform mixing is achieved.

The material is discharged onto a two-roll compacter and the compacted material in the form of a loosely compacted sheet is passed directly from the rolls through a grinder to form uniform particles of the clear vinyl resin mix, all of the particles being of a uniform size and passing through a 14-mesh screen, giving an average particle size less than about .070″.

The particles of the clear vinyl resin mix thus prepared are then mottled with particles of a linoleum binder composition which also have an average particle size of less than about .070″ and which are prepared from 112 parts by weight of an oxidized and polymerized linseed oil-rosin gel, 125 parts by weight of whiting and 77 parts by weight of wood flour, a ratio of 65% by weight vinyl particles to 35% by weight linoleum particles being used. These materials are mottled by adding them to a conventional mixer in which the particles are tumbled until uniform distribution is achieved.

The specially prepared mottle composition is then passed to the particular stencils which are utilized for providing the inlaid designs in the inlaid, molded linoleum product and regular molded linoleum mix is passed to the remaining stencils which form the background sheet. The linoleum product is formed therefrom in accordance with the disclosure of Berger, U.S. Patent 2,241,051.

After the surfacing layer is formed on the carrier to a depth of about 0.12″ the carrier sheet having the surfacing layer thereon is passed to flat bed presses where the surfacing layer is consolidated; in the first press an upper platen temperature of 240° F., a lower platen temperature of 345° F., a pressure of 140 p.s.i. and a dwell time of 8 seconds being used; and in the second press a top platen temperature of 210° F., a lower platen temperature of about room temperature or 70° F., a pressure of 1400 p.s.i. and a dwell time of 6 seconds being used. The product thus prepared, having a final surfacing layer thickness of about 0.054″ and having the clear vinyl resin fused throughout the inlaid design elements, is then stoved at about 185° F. for 6 to 8 days until the linoleum is sufficiently hardened. Prior to stoving the goods may be embossed if desired, no heat being used and a pressure of 1200 p.s.i. and a dwell time of 5 seconds being used in the embossing press. The fused clear vinyl resin in the inlaid design elements thus formed provides a window-like effect through which any glitter or other highlight or accent particles are readily visible.

*Example 2*

A special mottle was prepared as described in Example 1 except that to 63% by weight of particles of clear vinyl resin mix and 32% by weight of particles of linoleum binder there was added 5% by weight of fine particles of aluminum glitter coated so as to have the appearance of gold chips or flakes, the particles of aluminum glitter being approximately 1/32″ square and 0.0008″ in thickness. After the particles had been mottled by tumbling in the mixer to attain a uniform distribution, they were fed to the stencils which were utilized in producing the inlaid designs and a molded, resilient linoleum surface covering having a background of regular linoleum composition was formed in accordance with the method described in Example 1, FIG. 2 of the drawings attached hereto illustrates a cross-sectional view of a portion of the resilient floor covering thereby produced showing both the background material as well as a portion of an inlaid design element in which the particles of linoleum and glitter appear in the fused transparent vinyl matrix of the design element.

*Example 3*

An inlaid linoleum composition was prepared in accordance with the method set forth in Example 1 except that the particles of clear vinyl resin mix were formed from 65% by weight of a polyvinyl butyral resin and 35% by weight of dioctyl phthalate plasticizer. The composition of the polyvinyl butyral resin consisted of 54.4% vinyl, 38.3% butyraldehyde, 0.3% acetate, and 7.0% hydroxyl. A smooth inlaid linoleum surface covering having inlaid designs in which the fused clear vinyl resin achieved a window-like effect was thereby produced.

*Example 4*

An inlaid linoleum product was produced in accordance with the method described in Example 1 having the design elements formed from the same composition as that described in Example 3 except that to 61.5% by weight of the particles of clear vinyl resin mix and 30.5% by weight of linoleum particles was added 8% by weight of a phosphorescent zinc sulfide pigment. The finished inlaid linoleum resilient surface covering had design elements highlighted by the phosphorescent pigment in depth and achieved a quite unique phosphorescent effect in the dark.

Examples 1 and 3 above illustrate the formation of a resilient, inlaid linoleum surface covering in which the inlaid design elements present a clear window-like effect. Examples 2 and 4 illustrate the use of accent materials with the special mottle composition illustrated in Examples 1 and 3 to produce novel highlighting design effects in which the highlights comprise particles of accent materials concentrated within the window-like matrix formed of the mottle composition.

Certain advantages in the characteristics of the blend above described which have not been heretofore achievable are that by incorporating linoleum mix along with the clear vinyl within the preferred ranges the linoleum mix provides sufficient key to the felt so that it will not separate during the processing operations and the key will strengthen during stoving to form a bond which is comparable to the bond formed between the backing and the plain molded linoleum mix.

Where a clear vinyl mix is used as the accent alone, the mix posesses much less compressibility than the surrounding linoleum and leads to a rough, unkeyed accent using the conditions now employed in forming molded linoleum products. By blending with the preferred amount of linoleum mix in accordance with this invention, both the roughness and poor key are overcome.

I claim:
1. As a composition of matter useful in providing highlighted design elements in inlaid molded linoleum resilient surface coverings, a mottle comprised of, based on the total weight of the mottle,
 (A) 23 to 45% by weight of particles of a filled, oxidized and polymerized drying oil-resin gel linoleum binder;
 (B) 40 to 75% by weight of particles of substantially transparent plasticized thermoplastic vinyl resin composition compatible with said linoleum binder and selected from the group consisting of a hydrolyzed vinyl chloride-vinyl acetate copolymer resin and a polyvinyl acetal resin; and
 (C) 2 to 15% by weight of particles of accent material, the particles of substantially transparent vinyl resin composition and the particles of linoleum binder being substantially the same in size with all of the particles being smaller in size than the thickness of the design element which is formed from said mottle and the particles of accent material being not greater in size than the size of the particles of said vinyl resin composition.

2. A mottle as defined in claim 1 in which the particles of substantially transparent plasticized thermoplastic vinyl resin composition are formed from 50 to 75% by weight of a hydrolyzed vinyl chloride-vinyl acetate copolymer containing about 10% vinyl acetate of which 20 to 50% by weight of the acetate groups have been hydrolyzed, 15 to 35% by weight of a plasticizer for said copolymer, and 3 to 10% by weight of a stabilizer for said copolymer.

3. A mottle as defined in claim 2 in which the particles of accent material are metallic aluminum glitter particles.

4. A mottle as defined in claim 1 in which the particles of substantially transparent plasticized vinyl composition are formed from a plasticized polyvinyl acetal resin.

5. A mottle as defined in claim 4 in which the polyvinyl acetal resin is polyvinyl butyral.

6. A sheet of linoleum composition having inlaid therein design elements highlighted by particles of accent distributed throughout said elements, said design elements being comprised of a consolidated mottle composition comprised of, based on the total weight of the mottle,
 (A) 23 to 45% by weight of particles of a filled, oxidized and polymerized drying oil-resin gel linoleum binder;
 (B) 40 to 75% by weight of particles of substantially transparent plasticized thermoplastic vinyl resin composition compatible with said linoleum binder and selected from the group consisting of a hydrolyzed vinyl chloride-vinyl acetate copolymer resin and a polyvinyl acetal resin; and
 (C) 2 to 15% by weight of particles of accent material, the particles of said vinyl resin composition and the particles of linoleum binder being substantially the same in size and being smaller in size than the thickness of the design element which is formed from said mottle and the particles of accent material being not greater in size than the size of the particles of said vinyl resin composition.

References Cited

UNITED STATES PATENTS

| | | | |
|---|---|---|---|
| 1,873,587 | 8/1932 | Humphreys et al. | 154—49 |
| 2,502,457 | 4/1950 | Heckles | 260—23 |
| 2,962,081 | 11/1960 | Dobry et al. | 264—47 |
| 2,986,198 | 5/1961 | Kolker et al. | 154—49 |
| 3,015,356 | 1/1962 | White et al. | 264—76 |
| 3,157,561 | 11/1964 | Miller et al. | 161—164 |

DONALD E. CZAJA, *Primary Examiner.*

LEON J. BERCOVITZ, M. BERGERT, R. A. WHITE, R. J. CARLSON, *Assistant Examiners.*